United States Patent [19]
Colchester et al.

[11] 3,714,174
[45] Jan. 30, 1973

[54] MANUFACTURE OF BIPYRIDYLIUM SALTS

[75] Inventors: John Edward Colchester; John Gerard Carey, both of Runcorn, England

[73] Assignee: Imperial Chemical Industries Limited, London, England

[22] Filed: Dec. 5, 1969

[21] Appl. No.: 882,699

[30] Foreign Application Priority Data

Dec. 20, 1968 Great Britain................60,713/68

[52] U.S. Cl..............260/295 AM, 260/296 D, 71/94
[51] Int. Cl..............................................C07d 31/44
[58] Field of Search.....................260/295 AM, 296 D

[56] References Cited

UNITED STATES PATENTS 3,405,135   10/1968   Colchester et al............260/295 AM Primary Examiner—Alan L. Rotman
Attorney—Cushman, Darby & Cushman

[57] ABSTRACT

A process for the manufacture of a 1,1'-disubstituted-4,4'-bipyridylium salt which comprises treating the corresponding 1,1'-disubstituted-1,1',4,4'-tetrahydro-4,4'-bipyridyl with an organic compound which has a redox potential in water more positive than −1.48 volts as compared with the saturated calomel electrode and which reacts with a hydride ion with the formation of an anion which under the conditions of the reaction has a redox potential more positive than −0.45 volt as compared with the saturated calomel electrode.

10 Claims, No Drawings

MANUFACTURE OF BIPYRIDYLIUM SALTS

This invention relates to the manufacture of bipyridylium salts and particularly to a process for the manufacture of 1,1'-disubstituted-4,4'-bipyridylium salts which are useful herbicides by oxidation of the corresponding 1,1'-disubstituted-1,1',4,4'-tetrahydro-4,4'-bipyridyl.

In U.K. Patent Specification No. 1,073,081 we have described and claimed a process for the production of an N,N'-(or 1,1'-)-disubstituted-4,4'-bipyridylium salt by treating an N,N'-(or 1,1'-)-disubstituted tetrahydrobipyridyl with an oxidizing agent that is an organic compound which is a hydrogen acceptor and which has a redox potential in an aqueous system more positive than −1.48 volts with respect to the saturated calomel electrode.

We have now found that particularly suitable oxidizing agents for forming the bipyridylium salt are organic compounds which oxidize the tetrahydrobipyridyl and which react with a hydride ion [H$^-$] with the formation of a stable anion; such anions have a redox potential under the conditions of the reaction more positive than −0.45 volts with respect to the saturated calomel electrode.

Oxidation of the tetrahydrobipyridyl is believed to occur initially by removal of the hydride ion [H$^-$] therefrom to form an intermediate oxidation product, the hydride ion being accepted by the oxidizing agent to form an anion. The intermediate oxidation product is believed to react immediately with a further molecule of the oxidizing agent with removal of a hydride ion from the intermediate and formation of a second anion. The overall reaction is therefore oxidation of the tetrahydrobipyridyl to the corresponding 1,1'-disubstituted-4,4'-bipyridylium di-cation with formation of two anions. In order that the oxidation may proceed as above the anion formed in the initial stage of the oxidation must not abstract a proton from the intermediate oxidation product, and anions having this property are defined for the purposes of this specification as stable anions; they have redox potentials more positive than −0.45 volt. An alternative definition of the stable anion is that it is an anion which is stabilized by the 1,1'-disubstituted-4,4'-bipyridylium di-cation (the final oxidation product of the tetrahydrobipyridyl) under the conditions of the reaction.

According to the present invention we provide a process for the manufacture of a 1,1'-disubstituted-4,4'-bipyridylium salt which comprises treating the corresponding 1,1'-disubstituted-1,1',4,4'-tetrahydro-4,4'-bipyridyl with an organic compound which has a redox potential in water more positive than −1.48 volts as compared with the saturated calomel electrode and which reacts with a hydride ion with the formation of an anion which under the conditions of the reaction has a redox potential more positive than −0.45 volt as compared with the saturated calomel electrode.

The reaction may be carried out conveniently in solution, usually in a solvent which will dissolve the N,N'-disubstituted tetrahydrobipyridyl and preferably also the oxidizing agent. Suitable solvents include ethers, for example diethyl ether, tetrahydrofuran, 1,2-dimethoxyethane, bis-(2-methoxyethyl) ether, and 1,4-dioxane; ketones, for example acetone; nitro compounds, for example nitroalkanes; nitriles; hydrocarbons, for example benzene and hexane; organic bases, for example pyridine; halogenated hydrocarbons, particularly chlorinated hydrocarbons, for example chlorobenzene, chloroform and trichloroethylene; amides, particularly tertiary alkylamides for example dimethyl formamide; sulphoxides, for example dimethyl sulphoxide; sulphones for example sulfolane; and propylene carbonate. Although their use tends to lead to somewhat lower yields of bis-quaternary salts than can be obtained with the above-mentioned solvents, the reaction may also be carried out in other solvents if desired, for example in alcohols (including glycols) for example ethylene glycol, diethylene glycol, methanol, 2-(2-methoxy ethoxy) ethanol, and isopropanol. Mixtures of such solvents may be used if desired.

The N,N'-disubstituted tetrahydro-4,4'-bipyridyl may be in particular an N,N'-dialkyl tetrahydro-4,4'-bipyridyl, in which case our selected oxidizing agents are especially useful in giving good yields which are not obtainable with other oxidizing agents. The N,N'-dialkyl tetrahydrobipyridyl may be made in known manner for example by reducing an aqueous solution of an N-alkyl pyridinium salt (for example N-methyl pyridinium iodide) with sodium amalgam or by electrolytic reduction. Alternatively it may be made by treatment of the sodium derivative of tetrahydrobipyridyl with an alkyl halide. The process may also be applied to tetrahydro-4,4'-bipyridyls having a variety of other N-substituents, for example benzyl groups. In the case of 1,1'-dialkyl tetrahydrobipyridyls the alkyl groups advantageously contain from one to six carbon atoms.

There may also be used, in particular, those tetrahydrobipyridyls having as N-substituents a carbamidoalkyl group, especially an N,N-disubstituted carbamidomethyl group. Such compounds may be obtained by electrolytic reduction of the corresponding N-substituted pyridinium salt, as is more fully described in U.K. Patent Specification No. 1,073,082. The bipyridylium salts produced from these compounds may be made alternatively by reacting an N,N-disubstituted amide of a halogenated aliphatic monocarboxylic acid (especially an N,N-disubstituted chloroacetamide) with 4,4'-bipyridyl. The carbamidoalkyl groups are of the structure $-R_1-CO-NR_2R_3$ in which $R_1$ is a hydrocarbon radical (usually a methylene group $-CH_2-$) and $R_2$ and $R_3$ are hydrocarbon or substituted hydrocarbon radicals especially alkyl groups containing from one to four carbon atoms; the group $R_2$ and $R_3$ may, together with the attached nitrogen atom, form a heterocyclic ring (for example a piperidine or morpholine ring) which may optionally be substituted.

In the tetrahydrobipyridyls the pyridyl nuclei may be substituted in the 2, 3, 5 or 6-positions.

The reaction may be carried out conveniently at ambient temperatures, though higher or lower temperatures may also be used if desired for example from 0°C to 200°C, preferably not greater than 100°C. The particular reaction conditions to be employed in any particular instance will, of course, depend to some extent upon the particular reactants and solvent employed and can be determined by simple experiment.

The concentration of the tetrahydrobipyridyl is not critical and we have found that a concentration of about 0.5 mole per liter is satisfactory. For optimum results the amount of the oxidizing agent should be such that the molar ratio of the oxidizing agent to the tetrahydrobipyridyl is at least 2:1 and an excess of the oxidizing agent will normally be employed. Conveniently of the oxidizing agent can be employed as a solution in which case the concentration of the agent can be suitably about 0.5 mole per liter. A particularly suitable technique is to add a solution of the oxidizing agent of concentration about 0.5 mole per liter to a solution of the tetrahydrobipyridyl also of concentration about 0.5 mole per liter.

The organic oxidizing agent reacts with a hydride ion with the formation of a stable anion. There are two ways in which this anion can be formed and in each case an addition reaction takes place between the organic compound and the hydride ion. This addition product may itself be the stable anion, or the addition reaction may be accompanied by a simultaneous displacement reaction wherein an atom or a group is displaced from the organic compound in the form of the stable anion. The addition of the hydride ion and the displacement of the atom or group in the form of the stable anion occur at different sites in the molecule of the organic compound.

Among those organic compounds which undergo an addition reaction with the hydride ion to form an interaction product which is itself a stable anion there may be mentioned in particular cyclic organic compounds which on addition of the hydride ion give rise to anions having a highly conjugated ring structure and having one or more atoms of high electronegativity able to sustain a negative charge. The electronegativity of the atom or atoms able to sustain a negative charge should be greater than 2.5 on the Pauling Scale. The anions derived from these compounds have aromatic character and possess the characteristic closed system of $\pi$ electrons as do all atomatic anions. For convenience such anions are hereinafter called aromatic anions.

As cyclic organic compounds which may be used there may be mentioned in particular cyclic compounds containing either two heterocyclic nitrogen atoms or alternatively a heterocyclic nitrogen atom and a heterocyclic carbon atom of a carbonyl group. Examples of compounds of this class are isatin, flavin and its derivatives, for example riboflavin, alloxan, isoalloxazine, alloxazine, indophenols, indigo and its derivatives, pyrazolinones, oxindolones, imidazolinones and indazolinones.

Examples of other cyclic compounds which result in the formation of a stable aromatic anion directly are those containing two or more carbonyl groups in the cyclic structure, for example indane trione.

A further class of organic compounds which react with a hydride ion to form a stable anion directly is that class of compounds which contain one or more atoms of high electronegativity and a mesomeric potential sufficient to sustain a negative charge. An example of such a compound is tetracyanoethylene.

As stated hereinbefore a second general class of organic compounds which may be used are those which react with a hydride ion and from which a stable anion is displaced as a result of the reaction. These compounds may contain an anion which is displaced as a stable anion or alternatively they may contain an atom or group which is capable of being displaced as a stable anion. Examples of the former type of compound are nitrogen quaternary salts of suitable redox potential, for example pyridinium and phenazinium salts; and other salts such as pyrillium salts, thiapyril salts, sulphonium salts, for example methylene blue, and N-benzylnicotinamide quaternary salts.

After interaction of the N,N'-disubstituted-4,4'-tetrahydrobipyridyl and the oxidizing agent, there is formed a product which appears to be an addition product and is highly colored. This material reacts as a 1,1'-disubstituted-4,4'-bipyridylium salt and the organic anion may be released from it by treatment with a mineral acid, particularly hydrochloric acid, sulphuric acid, phosphoric acid, or acetic acid, though other acids may be used if desired.

For this acid treatment, temperature is not a very critical factor and a variety of temperatures may be used. The acid treatment produces the bipyridylium salt and the reduced form of the oxidizing agent. The bipyridylium salt and the by-products of reduction of the oxidizing agent can be recovered by conventional means.

The process of our invention has the advantages of providing very useful yields of bis-quaternary salts, as high as 80 percent or more of theory. It also has the advantage that it enables different salts to be prepared at will by use of the appropriate acid in the final stage; this provides a simple route to salts which are less corrosive than the chlorides which are usually the most accessible ones by the processes formerly available.

The invention is illustrated but in no way limited by the following examples.

Examples 1–9

A solution of N,N'-dimethyl tetrahydro-4,4'-bipyridyl (0.0156 mole) in toluene (50 ml) was added dropwise with stirring to a solution of alloxan monohydrate (0.04 mole) in dimethyl formamide (100 ml) at 25°C under an atmosphere of nitrogen. The mixture was stirred for 3 hours after the final addition of the tetrahydrobipyridyl solution and the resulting solid precipitate was then filtered off. 2N-hydrochloric acid (50 ml) was then added to decompose the reduced alloxan and to yield N,N'-dimethyl-4,4'-bipyridylium dichloride. The resulting precipitate derived from the reduced alloxan was filtered off; the filtrate contained 2.57 gm N,N'-dimethyl-4,4'bipyridylium cation, as determined by spectrophotometric and polarographic analysis.

The above procedure was repeated eight times using solutions of the oxidizing agent (0.04 mole) in the solvents (100 ml) shown in Table 1 below instead of the solution of alloxan monohydrate in dimethylformamide. In Table 1, "Time" represents the time for which the mixture was stirred after the final addition of the solution of the tetrahydrobipyridyl.

TABLE 1

| Ex. No. | Oxidizing agent | Solvent | Time (hrs.) | Reaction* Efficiency (%) |
|---|---|---|---|---|
| 1 | Alloxan monohydrate | Toluene | 3 | |
| 2 | Riboflavin | DMF | 3 | 36.5 |
| 3 | p-quinone dioxime | Diglyme | 2 | 20 |
| 4 | Benzal barbituric acid | Diglyme | | 35 |
| 5 | Indigo | DMF | 4.5 | 20 |

| | | | | |
|---|---|---|---|---|
| 6 | Isatin | Methyl cyanide | 4 | 45 |
| 7 | Indane trione | Ethyl acetate | 4 | 65 |
| 8 | Methyl red | DMF | 4 | 45 |
| 9 | Methyl violet | DMF | 4 | 40 |

*Reaction efficiencies are based on N,N'-dimethyl tetrahydro-4,4'-bipyridyl fed.
DMF represents dimethylformamide.

Examples 10–13

A solution of N,N'-dimethyl tetrahydro-4,4'-bipyridyl (0.156 mole) in toluene (50 ml) was added under an atmosphere of nitrogen to a solution of N-benzyl-3-carboxamidopyridinium chloride (0.04 mole) in anhydrous ethanol (100 ml) at 25°C. The mixture was stirred for 20 hours after which time toluene (100 ml) and then water (100 ml) were added. The aqueous phase was separated from the organic phase and was found to contain 1.93 gm of N,N'-dimethyl-4,4'-bipyridylium dichloride (50% efficiency) by spectrophotometric analysis.

This procedure was repeated three times (Examples 11, 12 and 13) but using the solutions of the oxidizing agents in the solvents shown in Table 2 below.

TABLE 2

| Ex. No. | Oxidizing Agent | Solvent | Time (hrs.) | Reaction* Efficiency (%) |
|---|---|---|---|---|
| 10 | N-benzyl-3-carbamido-pyridinium chloride | Toluene | 20 | 50 |
| 11 | Malachite green | DMF | 2 | 25 |
| 12 | Methylene blue | DMA | 3 | 80 |
| 13 | Triphenyl-2,4,6-pyrylium chloroferrate | Methyl cyanide/acetone | 4 | 40 |

*based on tetrahydrobipyridyl fed.
DMA represents dimethylacetamide.

Examples 14–38

The experimental procedure in each example was as follows

A solution of 1,1'-dimethyl-1,1',4,4'-tetrahydro-4,4'-bipyridyl (0.0156 mole) in toluene (50 ml) was added dropwise over a period of 1 hour to a stirred solution of the oxidizing agent (0.04 mole) in the specified solvent at room temperature under an atmosphere of nitrogen. The resulting mixture was then maintained at the specified temperature for the stated period, after which time an excess of dilute hydrochloric acid was added. The resulting mixture was analyzed and was found to contain 1,1'-dimethyl-4,4'-bipyridylium cation in each example.

The results are shown in Table 3, in which reaction efficiencies are based upon tetrahydrobipyridyl fed:

TABLE 3

| Ex. No. | Oxidizing Agent | Solvent (mls) | Temp. (°C) | Time (hrs.) | Efficiency (%) |
|---|---|---|---|---|---|
| 14 | Alloxan | DMF (100) | 25 | 3 | 66 |
| 15 | Alloxan | Ethanol (100) | 25 | 3 | 57 |
| 16 | Riboflavin | DMF (100) | 25 | 4 | 36 |
| 17 | Riboflavin | Ethanol (100) | 25 | 3 | 22 |
| 18 | Benzal barbituric acid | DMF (100) | 25 | 4 | 30 |
| 19 | Indigo | DMF (100) | 25 | 4 | 16 |
| 20 | Isatin | CH₃CN (100) | 25 | 4 | 57 |
| 21 | p-quinone dioxime | CH₃CN (100) | 25 | 4 | 36 |
| 22 | p-quinone dioxime | Diglyme (75) | 25 | 2 | 20 |
| 23 | N-methyl maleimide | Diglyme (100) | 25 | 2 | 33.5 |
| 24 | Phthalamide | CH₃CN (75) | 25 | 4 | 5.8 |
| 25 | Phenolphthalein | CH₃CN (75) | 25 | 3 | 6 |
| 26 | | DMF (100) | 25 | 2 | 32 |
| 27 | Malachite green | CH₃CN (200) | 25 | 4 | 32 |
| 28 | Methyl red | CH₃CN (200) | 25 | 4 | 30 |
| 29 | Methyl red | DMF (100) | 25 | 4 | 44 |
| 30 | Methyl violet | CH₃CN (200) | 25 | 4 | 53 |
| 31 | Methyl violet | DMF (100) | 25 | 4 | 35 |
| 32 | Methylene blue | DMA (100) | 25 | 3 | 70 |
| 33 | N-methyl phenazonium methosulphate | CH₃CN (200) | 25 | 4 | 63 |
| 34 | 2,6-diphenyl pyrylium FeCl₄⁻ | CH₃CN (200) | 20 | 4 | 15 |
| 35 | 2,4,6-triphenyl pyrylium FeCl₄⁻ | CH₃CN (200) | 20 | 4 | 35 |
| 36 | N-benzyl nicotinamide chloride | Ethanol (100) | 20 | 20 | 50 |
| 37 | m-dinitrobenzene | Toluene Toluene (75) | 80 | 4 | 10 |
| 38 | Beta-nitrostyrene | Toluene (75) | 80 | 5 | 10 |

What we claim is:

1. A process for the manufacture of a 1,1' lower alkyl or carbamido lower alkyl-disubstituted -4,4'-bipyridylium salt which comprises treating at 20°C to 80°C the corresponding 1,1'-disubstituted-1,1'-4,4'-tetrahydro-4,4'-bipyridyl with an organic oxidizing agent which has a redox potential in water more positive than −1.48 volts as compared with the saturated calomel electrode and which reacts with a hydride ion removed from the said tetrahydrobipyridyl to form a stable anion which under the conditions of the reaction has a redox potential more positive than −0.45 volt as compared with the saturated calomel electrode, said oxidizing agent being selected from the group consisting essentially of alloxan, alloxan monohydrate, riboflavin, p-quinone dioxime, benzal barbituric acid, isatin, indane trione, methyl red, methyl violet, N-benzyl-3-carbamido-pyridinium chloride, malachite green, methylene blue, triphenyl-2,4,6,-pyrylium chloroferrate, N-methyl maleimide, phthalimide, phenolphthalein, M-methyl phenazonium methosulphate, 2,6-diphenyl pyrylium chloroferrate, N-benzyl nicotinamide chloride, m-dinitrobenzene and beta-nitrostyrene, the said oxidizing agent and bipyridyl being dissolved in an inert organic solvent therefor.

2. A process as claimed in claim 1 wherein the temperature is less than 100°C.

3. A process as claimed in claim 1 wherein the tetrahydrobipyridyl is employed in the form of a solution in which its concentration is about 0.5 mole per liter.

4. A process as claimed in claim 1 wherein the organic oxidizing agent is employed in the form of a solution in which its concentration is about 0.5 mole per liter.

5. A process as claimed in claim 1 wherein the molar ratio of the organic oxidizing agent to the tetrahydrobipyridyl is at least 2:1.

6. A process as claimed in claim 1 wherein the N-substituents of the tetrahydrobipyridyl are lower alkyl groups.

7. A process as claimed in claim 1 wherein the alkyl groups contain from one to six carbon atoms.

8. A process as claimed in claim 1 wherein the N-substitutents of the tetrahydrobipyridyl are carbamido lower alkyl groups.

9. A process as claimed in claim 1 wherein the said carbamidoalkyl groups are N,N-dialkyl carbamidomethyl groups.

10. A process as claimed in claim 1 wherein the N-alkyl groups contain from one to four carbon atoms.

* * * * *